US005774885A

United States Patent [19]

Delfer, III

[11] Patent Number: 5,774,885

[45] Date of Patent: Jun. 30, 1998

[54] SYSTEM AND METHOD FOR COMBINING INDIVIDUAL STATEMENTS INTO A SINGLE MAILING ENVELOPE

[75] Inventor: Frank W. Delfer, III, Lebanon, N.J.

[73] Assignee: International Billing Services, Inc., Rancho Cordova, Calif.

[21] Appl. No.: 561,358

[22] Filed: Nov. 21, 1995

[51] Int. Cl.[6] .................... G06F 17/00

[52] U.S. Cl. .................... 705/401; 53/147; 53/154; 364/478.07

[58] Field of Search .................... 53/147, 154; 209/584, 209/900; 270/52.01, 58.01, 58.06, 58.07, 58.09; 364/400, 464.11, 464.16, 464.2, 478.02, 478.07, 478.11; 705/401, 406, 410

[56] References Cited

U.S. PATENT DOCUMENTS

| | | | |
|---|---|---|---|
| 4,959,195 | 9/1990 | Christensen et al. | 364/464.17 |
| 5,051,914 | 9/1991 | Sansone et al. | 364/478.11 |
| 5,068,797 | 11/1991 | Sansone et al. | 364/478.07 |
| 5,072,401 | 12/1991 | Sansone et al. | 364/478.07 |
| 5,264,665 | 11/1993 | Delfer | 177/25.15 |
| 5,429,249 | 7/1995 | Belec et al. | 209/584 |

*Primary Examiner*—Edward R. Cosimano
*Attorney, Agent, or Firm*—James M. Ritchey

[57] ABSTRACT

A billing system for combining into a statement pack, fitted within a minimum number of master mailing envelopes, individual user billing statements and other desired inserts. Each billing statement is comprised of one or more constituent documents, from the same or different service providers that are to be delivered to a common mailbox. Postal coding information is utilized for determining which user billing statements are delivered to the common mailbox.

32 Claims, 5 Drawing Sheets

SYSTEM AND METHOD FOR COMBINING INDIVIDUAL STATEMENTS INTO A SINGLE MAILING ENVELOPE

BACKGROUND OF THE INVENTION

1. Field of the Invention

Describe here is a system and procedure for combining individual user statements from various sources or service providers that are to be delivered to the same mailbox. More specifically, once identified and combined, the combination of statements are placed into a single envelope, in most cases, and mailed to a described mailbox, thereby saving physical handling effort and mailing costs.

2. Description of the Background Art

Traditionally, companies that provided billing facilities and statement mailing capabilities for more than one or various types of client or service provider accounts such as cable, telephone, utilities, and similar services have sent separate bills or statements to each customer or user for each of the individual services handled by the company. No efficient method existed for combining the billings that go to one customer or user into, ideally, one, but perhaps more than one envelope, hence saving on postage costs and handling time. If one user had cable, telephone, and electric bills then three separate statements would be sent in three separate envelopes with three separate mailing costs. Compared with the subject system and process, existing mailing procedures for multiple accounts on one customer are expensive and time intensive.

Additionally, for individuals and businesses processing a considerable quantity of mail, postal agencies, like the United States Postal Service (USPS), often have available various discount direct mailing rates. Taking advantage of these lower rates is often the difference between a profitable and a nonprofitable enterprise. However, to benefit from these discount mailing rates several stiff hurdles exist. Hopefully, to maximize the efficiency of an operation and to lower costs, the postal agency attaches rigorous rules and regulations that, until the creation of subject system, have required a substantial loss of time in sending the mail out the door of the business and into the hands of the postal agency. Postal discount rate qualification rules present a gradient in benefits. For example, the USPS has weight rules for obvious reasons and traying rules which set the requirements for the type of mail that is placed i n a standard mailing tray. Such considerations as grouping zip codes within a mailing tray, sequencing zip codes, listing carrier routes, even to a single or common mailbox with a zip-plus-six, delivery point barcode, or like system, filling a mailing tray to its total thickness or height and weight limits, and the like all serve to build additional postal discounts. The subject computer directed system serves to maximize the postal discount by overseeing the mailing process within the framework of the postal rules.

The foregoing information reflects the state of the art of which the applicant is aware and is tendered with the view toward discharging applicant's acknowledged duty of candor in disclosing information which may be pertinent in the examination of this application. It is respectfully submitted, however, that this information does not teach or render obvious, singly or when considered in combination, applicant's claimed invention.

SUMMARY OF THE INVENTION

An object of the present invention is to provide a system and procedure that combines a plurality of billing statements into a minimum number of mailing envelopes.

Another object of the present invention is to disclose a system and procedure that permits a billing facility to minimize postal mailing costs by combining a plurality of bills that are being mailed to a single mailbox into fewer envelopes than the number of bills.

A further object of the present invention is to describe a system and procedure that permits a billing facility to minimize postal mailing costs and processing time by combining a plurality of bills that are being mailed to a single mailbox into preferably one mailing envelope.

Still another object of the present invention is to furnish a system that analyzes the cost savings for combining multiple billings into a single envelope and then mailing that combined envelope to a designated mailbox.

Disclosed is both a system and method for combining into a statement pack a plurality of billing statements from the same or different service providers and other items such as advertisements, coupons, legal documents, and the like. Generally, the individual billing statements, one from each service provider, can be enclosed within individual envelopes and then placed within a master mailing envelope with other items or all of the individual billing statements, one or more from each service provider, can be enclosed in a grouped packet, without individual envelopes, and placed within the master mailing envelope.

More precisely, provided is a computer directed billing system for combining into a statement pack having a single master mailing envelope, individual user billing statements from the same or different service providers that are to be delivered to a common mailbox. The subject system comprises one or more separate or interfaced computers and operating systems that utilize, store, access, and manipulate various programs and files for the subject invention. Created for the subject system and process are key files, usually a key file exits for each statement within a billing facility, containing data relevant billing information for each user billing statement from each service provider participating in the combination billing system. Typically, the information includes, but is not limited to, type of service, address, telephone number, financial institution information for the user and service provider, various account numbers, billing cycle data, and the like.

Means are furnished for incorporating postal information such as a zip-plus-six number or delivery point barcode in a process for analyzing the key files to determine which user billing statements are to be delivered to a common mailbox. Additionally, means are included and directed by the computer for analyzing and generating, in association with the postal code and key files, a statement pack file indicating the most cost effective combination of user billing statements to be placed in the master billing envelope based on a weight and a thickness value for each document comprising each user billing statement. The most cost effective combination is based on postal regulations for various types of bulk mailings that are described in more detail below in the specification section that deals with the postal processing sub-system that is utilized within the subject invention system and process.

Further, since bulk mailings are usually sent to the postal service via mailing trays, provided are means for determining optimal loading of each mailing tray with either non-combined billing statements (normal bulk mail) or the combined billing statements utilizing and updating the generated statement pack file. Once an optimal loading scheme, pattern, plan, or order is determined, supplied are both means for assembling and loading optimally each the non-combined billing statement into a normal mailing tray and means for assembling each of the user billing statements into an individual envelope from the constituent documents required to form each user billing statement that is eligible for combining into a minimum number of master mailing envelopes and loading each of the individual envelope containing a user billing statement into a statement pack tray.

Supplied are means for obtaining from the loaded statement pack trays the user billing statements that are to be delivered to a common mailbox and therefore the ones that will be combined into the single master mailing envelope. The selected user billing statements are inserted into the proper master mailing envelope or envelopes.

Usually, included in the subject invention are means for printing mailing information on each master mailing envelope and means for printing a list of each user billing statement contained in each master mailing envelope on the master mailing envelope containing the billing statement. Means are provided for determining the weight and thickness values for each item or envelope that is to be mailed.

More specifically, the means for obtaining from each the statement pack tray the user billing statements that are to be delivered to a common mailbox and inserting the user billing statements into a single master mailing envelope to create a statement pack comprises a statement pack tray storage system having means for identifying the location of each statement pack tray which in turn identifies which individual envelopes are within each statement pack tray. Also, involved is means for identifying which statements pack trays are to be pulled and in what order for assembly of the statement packs and a sorter for grouping individual envelopes that will be combined into a statement pack into sorted trays in proper order. Ordinarily, a statement pack inserter for assembling of the statement packs from the sequenced grouped individual envelopes is furnished.

For the subject system and process the statement pack inserter generally comprises means for printing postal address information on the master envelope, means for printing on the master envelope which the individual envelopes having billing statements are contained within the master envelope, and means for inserting individual envelopes and any other selected inserts into the master envelope.

A subject computer directed method for combining user billing statements from the same or different service providers that are to be mailed to a common mailbox into a statement pack relies on the above summarized system. Items within each statement pack include a master mailing envelope (perhaps more than one master mailing envelope if many billing statements are involved), one or more billing statements with each billing statement comprising one or more billing sheets from a particular service provider often held within an individual statement envelope but without individual statement envelopes if desired, and optionally, various types and quantities of inserts either within each individual statement envelope or not within each individual statement envelope but within the master envelope. In general, the method comprises creating key files for each of the user billing statements that have relevant billing and postal coding information. A program analyzes which user billing statements will be delivered to a common mailbox based on the postal coding information and a weight and thickness for each item within the statement pack, whereby a most cost effective combination of items within the master mailing envelope is achieved.

A statement pack file is produced that includes all of the billing statements that can be combined into a statement pack. The statement pack file is processed through means for producing the billing statements, followed by optimally loading statement pack mailing trays with the combinable billing statements and updating the statement pack file with the optimal loading information. Preferably, the producing and loading means labels each statement pack tray with an identifying label containing various relevant information. The optimally loaded statement pack mailing trays are stored and accessed by means of the identifying label.

A statement pack tray feed order file is generated that indicates the order in each which statement pack tray is to be pulled for delivery to a sorter that prepares the billing statements for inclusion in the master envelope. Likewise, a stacker file is constructed that indicates which billing statements are placed in which stacker of an inserter that forms the final statement pack. Thus, the combined statement pack is produced by utilizing the order file and the stacker file in conjunction with an inserter. Lastly, the mailing trays are loaded with statement packs for mailing.

Additionally, the subject method often comprises the step of printing postal information on each master mailing envelope, printing on each master mailing envelope a list of billing statements enclosed in each master mailing envelope, and inserting into each master mailing envelope additional inserts.

Other objects, advantages, and novel features of the present invention will become apparent from the detailed description that follows, when considered in conjunction with the associated drawings.

DESCRIPTION OF THE PREFERRED EMBODIMENT

Figure 1:
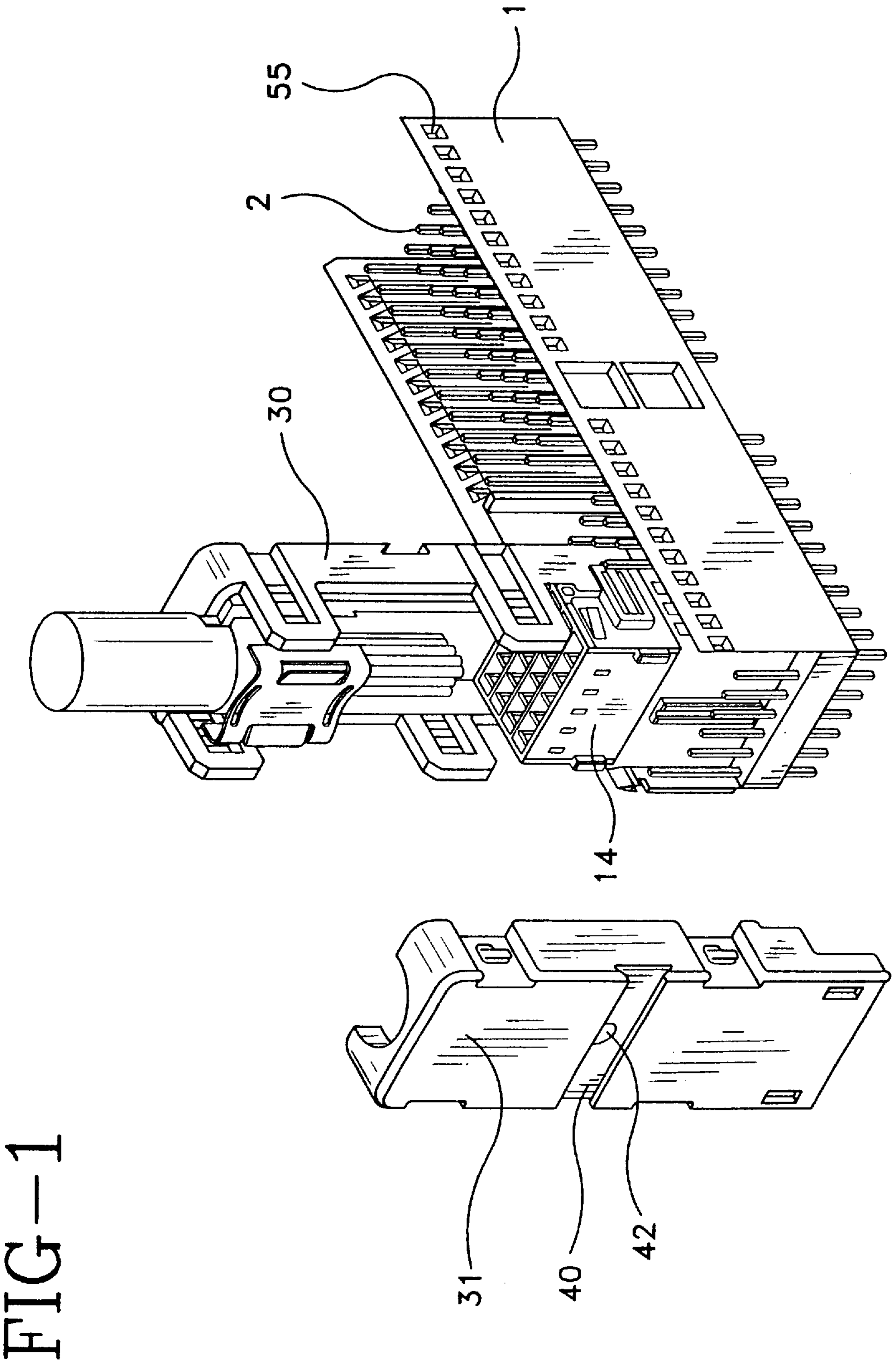
FIG. 1 is a summary flow diagram of the central components of the subject system.

Referring now to FIG. 1, there is shown a summarizing flow diagram of the subject billing statement combination invention. The subject is usually utilized by a bulk mailer that has one or more mailing facilities for assembling bulk mailings. Interfaced computers with appropriate software, hardware, and firmware facilitate the operation of various bulk mailing pieces of equipment such as inserters, printers, transport devices, collators, sorters, storing and retrieval systems, mailing tray assemblers and handlers, and the like. Although many different types of mail are processed by bulk mailers, bulk mailing companies often handle billings for several service providers having overlapping or common customers or users. Bulk billings will be employed for exemplary purposes only, but other than bulk mailings for billing statements may be processed by the subject invention such as polling information, advertising materials, sales or merchandising data, and similar articles. However, for billing statements, the typical services provided are cable television programming, telephone communications, utilities, and the like.

Traditionally, if more than one billing statement was sent by the bulk mailer to the same customer or user each billing statement was mailed in its own separate envelope. On the basis of standard bulk postal rates and facility usage efficiency, both time and money were wasted in the single statement mailing process. The subject invention permits the efficient combination, into a minimum of master mailing envelopes, a plurality of billing statements going to one user, or in particular one mailbox. Depending upon the exact number of billing statements, one or more master mailing envelopes are utilized to contain the common mailbox billing statements.

Not all billing statements are identical in the exact components present, but the subject device is versatile enough to handle most, if not all, conceivable statement variations. Typically, a billing statement is comprised of one or more billing pages (often a summary page followed by one or more detail pages) and various inserts for advertising, legal, sales, and like purposes.

As indicated above, the subject system comprises a billing system for combining, into a minimum number of master mailing envelopes, individual user billing statements, comprised of one or more constituent documents, from the same or different service providers that are to be delivered to a common mailbox. The combined billing statements for one common mailbox is entitled a "statement pack."

More characteristically, comprising the subject invention is means for utilizing postal coding information for determining which user billing statements are delivered to the common mailbox. The postal coding information that directs mail to a common mailbox is found in the "zip-plus-six" notation that is also termed the "delivery point barcode." The zip-plus-six number indicates to which mailbox any piece of mail is to be delivered. However, any later developed postal coding technique or information is easily incorporated into the subject system.

Usually, one master envelope is sufficient to contain all of the billing statements being mailed to one mailbox. However, should cost and efficiency considerations dictate more than one master envelope then a suitable and cost effective number of master envelopes will be utilized to contain the material going to a common mailbox.

More particularly and as clearly indicated in FIG. 1 for the subject invention, key files 10 are created that are accessible by the controlling computer or computers located in the immediate vicinity or at a distant location an suitable connected and interfaced. Ideally, for each statement being processed in the bulk mailing facility there exists a key file 10. The key files 10 contain data relevant billing information for each user billing statement such as the related service providers, transaction data, product usage data from each service provider, address information, banking or financial institution information, relevant authorization for utilizing billing procedures, and the like.

Service providers often prefer to have billing information relevant to their entity or association be held within its own envelope and not grouped directly together with statements from other providers. Thus, normally, each billing statement for any particular service provider is inserted with its various page configurations within an individual envelope (each service provider's individual envelope may have identifying indicia, logos, and other information imprinted on its surface and the like), along with other possible inserts such as advertisements, notices, coupons, and the like. However, should the service provider elect, weight, thickness, and therefore postal costs may be saved by merely grouping the various billing statements together with or without individual envelopes within the master envelope.

Via a suitably configured and linked computer, a program dubbed or entitled "The Mailbox Analyzer" 15 utilizes the key files 10 to determine which statements will be sent to the same or common mailbox. The Mailbox Analyzer utilizes the postal zip-plus-six numbers or equivalent indicia to determine which user billing statements have a common mailbox address and schedules these billing statements to be grouped into a minimum number of master mailing envelopes, preferably one master mailing envelope per mailbox address.

Means are provided for determining the weights and thicknesses of each piece or item within any billing statement and within the final statement pack, including, in addition to the actual billing documents, any general inserts. Details of the weight and thickness determining means are discussed more below for the postal processing sub-system, however, the weights and thicknesses of each piece to be mailed are determined by standard means and stored in suitable data bases accessible by the computer. Based on postal codes or regulations for the cost of mailing certain weights and thicknesses of mailable items, The Mailbox Analyzer 15, in association with the key files 10 and postal regulations determines the most cost effective combination of user billing statements and generates a statement pack file 20 that contains which billing statements can be combined together into a statement pack. Usually, the gathered statement pack utilizes a single master envelope to hold the combined billing statements, but more than one master mailing envelope is possible if this division leads to cost savings by fitting within the prescribed postal regulations.

Mailing trays are utilized to ship collections of envelopes through the postal service. Postal regulations for bulk mailings are designed to give mailing discounts for filling a mailing tray according to specifications that make the mailing process more efficient (the tray within prescribed weight limits, grouped zip codes, and the like). Included in the subject invention the postal processing sub-system or means for determining the optimal loading of a mailing tray (see U.S. Pat. No. 5,264,665 and below for details of how this sub-system functions) with either non-combined billing statements or the combined billing statements or statement packs. A tray key file 30 having relevant information about every tray to be assembled is updated. Likewise, the statement pack file 20 is updated 35 with information about how the postal processing sub-system has handled or selected which statements will go to which mailing trays. Also, a container file is often created to identify where statements can be found by including more details than the tray key file 30.

If a billing statement is eligible 45 to fit within a statement pack it is directed for formation into a statement pack mailing tray 55 and if a billing statement is not eligible 50 to fit within a statement pack it is directed for formation into a normal mailing tray 60. Thus, it is the usual process that the mailing trays, once formed, are handled separately as statement pack mail and normal mail. The normal mailing trays 60 are now optimally loaded and ready for additional processing for mailing, as indicated below, whereas the statement pack tray 55 holds only the billing statements either within or not within individual envelopes that are eligible to fit within a statement pack.

For actually assembling the normal 60 or statement pack 55 trays means are provided as described in the postal processing sub-system description below. Thus, means are provided for assembling and loading optimally each the non-combined billing statement into a normal mailing tray 60 as described in the postal processing sub-system description below and means are supplied for assembling each of the user billing statements into an individual envelope from the constituent documents required to form each user billing statement that is eligible for combining into a minimum number of master mailing envelopes and loading each the individual envelope containing a user billing statement into a statement pack tray 55. Labels are attached to each tray indicating its contents. Preferably, the labels are machine readable via a bar code or equivalent device.

At this point for the system and process the normal mailing tray 60 is optimally loaded and processed in a manner described below in the postal processing sub-system section. As for the statement pack mailing tray 55, further processing is required.

Although manual storage and retrieval means are acceptable for the subject system, generally, mechanical means exist for obtaining from each of the statement pack trays the user billing statements that are to be delivered to a common mailbox and therefore combined into the single or minimum number or master mailing envelopes and inserting the selected user billing statements into the master mailing envelopes. In particular, the statement pack tray 55 is sent to an automated storage system 65 until called for, with its position noted in an appropriate file. Automated storage systems that store and retrieve items under computer control are readily available from various suppliers and may be readily purchased. Storage and retrieval are based on the machine readable label, or the equivalent, associated with each statement pack tray. Random access to all stored trays is possible and thus permits any particular statement tray to be withdrawn upon request by the computer or operator. More particularly, a program termed "The Mail Tray Analyzer" 70 accesses the statement pack file and establishes which user billing statements are in which mailing trays. The Mail Tray Analyzer 70 program determines in which order the trays are to be pulled for assembly of the master envelopes and establishes two separate files for this process; the "Tray Feed Order File" 75 and the "O/P Stacker and Mailbox Table File" 80 (with O/P referring to "OutPut"). The Tray Feed Order File 75 notes the locations of the mailing trays within the automated tray storage system 65 and tells the automated tray storage system 65 the order in which to pull the trays and deliver them to the sorter 85. The O/P Stacker and Mailbox Table File 80 is utilized in conjunction with the sorter 85 and tells the sorter 85 which statements are placed into which of the sorter's output stackers that hold billing statements.

The sorter 85 is a purchasable item and is similar to ones utilized by the postal facilities. The sorter 85 places the sorted billing statements into trays. The billing statements will be grouped together with many different groups in a single tray. These grouped trays are then sent to the statement pack inserter 90 which inserts each group of billing statements into one or more, usually one, master mailing envelope, as directed by the overseeing computer.

Further comprising the inserter 90 mechanism is means for printing mailing information on each the master mailing envelope such as box address, return address, and the like. Additionally, the inserter 90 mechanism is means for printing a list of each user billing statement contained in each of the master mailing envelopes on each of the master mailing envelopes.

It is noted that the statement pack inserter also comprises means for placing, in addition to billing statements, any other desired or selected inserts into the master envelope. Also, the usual transport, wetting, and sealing means are found in connection with the inserter 90.

Once the statement packs are assembled, they are placed in trays and mailed 95 via appropriate routes.

For clarity of the method utilizing the above described system description, a review of the subject processing steps is presented. The computer directed method utilizing the above noted system for combining consumer billing statements from the same or different service providers that are to be delivered to a common mailbox in a statement pack, wherein items within each statement pack include at least one master envelope, one or more billing statements with each billing statement comprising one or more billing sheets held either within an individual statement envelope or merely grouped together without an individual envelope, and optionally, various types and quantities of inserts either within each individual statement envelope or not within each individual statement envelope but within the master envelope, comprises the following general steps: identifying, with the aid of the computer, billing statements that are to be delivered to the common mailbox via use of a postal code, zip-plus-six, delivery point barcode, or like device; determining weights and thicknesses for each of the items comprising the statement pack; and establishing with the aid of the computer the most cost effective combination of one or more billing statements and other items comprising the statement pack to maximize savings in postal costs for delivering the statement pack by utilizing postal agency mailing discount rates that require adherence to a set of postal agency qualification rules. Further comprising the subject method is the step of loading mailing trays with statement packs in a manner that maximizes savings in postal costs for assembling mailing trays in a manner that benefits from discount postal rates that require adherence to a set of postal agency qualification rules for filling the mailing trays.

More particularly, the subject method utilizes a computer that oversees the combining of user billing statements from the same or different service providers that are to be delivered to a common mailbox in a statement pack, wherein items within each statement pack include a master envelope, one or more billing statements with each billing statement comprising one or more billing sheets from a particular service provider either within or not within individual statement envelopes, and optionally, various types and quantities of inserts either within each individual statement envelope or not within each individual statement envelope but within the master envelope and comprises the steps of: creating key files 10 for each of the user billing statements that have relevant billing and postal coding information; analyzing 15 which user billing statements will be delivered to a common mailbox based on the postal coding information (zip-plus-six, delivery point barcode, and the like) and a weight and thickness for each item within the statement pack, whereby a most cost effective combination of items within the master mailing envelope is achieved; producing a statement pack file 20 having all billing statements that can be combined into a statement pack; processing the statement pack file through means 25 for producing the billing statements and optimally loading statement pack mailing trays containing the combinable billing statements and updating the statement pack file 35 (and the tray key file) with optimal loading information, whereby the producing and loading means labels each statement pack tray 55 with an identifying label (note that the statement pack mailing trays are loaded with statements in the optimum order for later feeding into the sorter to minimize the number of passes on the sorter and the same is true for the order the trays are fed into the sorter); storing 65 optimally loaded statement pack mailing trays that are accessed or identified by means of the label applied to the tray or equivalent means; generating a statement pack tray feed order file 75 indicating the order in each which statement pack tray is to be pulled for delivery to a sorter 85; constructing a stacker file 80 indicating which billing statements are placed in which output stacker of the sorter 85 that feeds an inserter 90 that forms the statement pack (note that the information in the stacker file 80 is downloaded into the sorter to control the placement of the statements into the sorter's output stackers); utilizing 70 the order file 75 and the stacker file 80 in conjunction with the sorter 85 and inserter 90 to produce each of the combined statement packs; and loading mailing trays with statement packs for mailing 95.

As noted above, further comprising the subject method are the steps of printing postal information on each master mailing envelope and printing on each master mailing envelope a list of billing statements enclosed in each master mailing envelope. Additionally, also note above, further comprising the subject method is the step of inserting into each master mailing envelope additional inserts.

POSTAL PROCESSING SUB-SYSTEM

The postal processing system (see FIGS. 2A, 2B, 2C and 3) presented in U.S. Pat. No. 5,264,665, which is herein incorporated by reference, is a useful and necessary subsystem or component piece of the more complex subject invention for combining statements going to a common mailbox in a cost saving manner. The essential details of the U.S. Pat. No. 5,264,665 patent are present below to explain and clarify their use in and as part of the subject invention (note that the figure numbers and reference numbers in the '665 patent have been altered to merge with the numbers selected for the subject specification).

The postal processing system presented in U.S. Pat. No. 5,264,665 is a computer directed sub-system, relative to the current subject system, for optimizing direct mailing costs, minimizing the amount of delay in grouping, according to a postal agency's rules, mailable items for mailing, and tracking mailed items.

More particularly, described is a computer directed subsystem for use by an operator engaged in sending mailing pieces (either normal pieces or combined statement packs) via a postal agency. Each mailing piece is sent to a specific user or consumer and comprises a sending or master envelope containing various types and quantities of inserts (inserts may include the billing statements themselves). By utilizing the postal agency's mailing discount rates, that require adherence to a set of postal agency qualification rules, the computer directed sub-system optimizes the efficiency of the mailing and the derived cost benefits. Further, if a mailing piece is lost during the mailing process, the lost mailing piece may be tracked by following a data trail from creation to supposed delivery.

Specifically, the subject sub-system comprises means for determining an individual weight and thickness of each insert type placed in the sending envelope and the sending envelope, including a master envelope for holding one or more statement pack envelopes, and for communicating the individual weight and thickness determinations to a data processing location. The term "inserts" includes any item within a sending or master envelope including, but not limited to, billing statements having one or more pages, legal notices, various documents, advertising fliers, coupons, return envelopes, individual envelopes for holding billing statements directed to individual or grouped service providers, and the like. Included are means for inserting selectively each insert into the an envelope (individual statement or master envelope) to produce the mailing piece or final statement pack, as directed from the data processing location. Means are provided for loading a plurality of mailing trays with a plurality of the mailing pieces, individual statement containing envelopes, or statement packs. Means are furnished for printing and applying a mailing tray label for each loaded mailing tray of any type (e.g. a tray normal tray, a statement pack tray, and the like). Each mailing tray label indicates which specific consumers' mailing pieces (note that when the term mailing piece is used below that term includes the use of an individual statement envelope and statement pack as the piece eventually to be mailed) are placed in each loaded mailing tray, as directed from the data processing location. Means are given for determining an actual weight of each loaded mailing tray along with means for comparing the actual weight of each loaded mailing tray with a projected weight. The comparison is to establish an acceptable weight variance between the two and for rejecting each loaded mailing tray not within the acceptable weight variance. Each loaded mailing tray projected weight is provided from the data processing location. Also, means are supplied for determining the actual number of mailing pieces loaded into each mailing tray and means for rejecting each mailing tray not having the actual number of mailing pieces the same as the projected number of mailing pieces.

Directing the subject sub-system is a computer (usually the same or interfaced to the computer directing or controlling the entire statement pack system) at the data processing location. The computer has data storage means with information files containing consumer data indicating a quantity for each insert type to be inserted into each envelope. Also, files contain the postal agency qualification rules employed for the optimization. Additional files contain the communicated individual weight and thickness determinations for each insert type and the sending envelope as well as weight data for the mailing tray in an unloaded state. Further, the files contain the necessary statement pack information indicated above.

Concerning the subject sub-system, the subject computer or computers contain instructions in a program or programs for utilizing the information files for processing the efficiency and cost benefits optimization. Several steps are involved in the processing and include calculating from the communicated individual thickness determinations a projected number of mailing pieces or statement packs within each loaded mailing tray, wherein the projected thickness is acceptable under the postal agency rules. The acceptable number of mailing pieces held in each mailing tray is based on a calculated projected total thickness or weight for each mailing piece and is determined by combining the communicated individual thicknesses of each sending envelope and the inserts (including the statement or billing sheets or pages) within each envelope or master envelope and determining if the projected total thickness meets the postal agency rules for an acceptable total thickness or height of a loaded mailing tray. Included in the computer programming is a process for calculating the projected weight of each loaded mailing tray from the mailing tray weight, the communicated individual weights, and the projected number of mailing pieces or statement packs within each loaded mailing tray. The loaded mailing tray projected weight is communicated to the comparison means, usually a stand-alone computer, for accepting or rejecting each mailing tray. In addition, the program determines, based on the projected number of mailing pieces or statement packs within each the loaded mailing tray, a range indicating which specific consumers (envelopes) are within each loaded mailing tray and directs the mailing tray label printing and applying means to denote the range of specific consumers (envelopes) on the mailing tray label. Usually, if the tray is to be mailed and is not one used in forming the statement packs, the mailing tray printing and mailing means prints and applies in addition to the mailing tray label an ACT tag indicating a destination airport location for the mailing tray.

Generally, means are provided for creating a mailing manifest, with associated postage data, and for printing the mailing manifest and postage data in report form as directed by the computer. Also, means are provided for creating a mailing manifest, with associated postage data, and for electronically transferring the created mailing manifest and postage data to a facility for transferring funds in payment of postage due for sending the mailing pieces.

Figure 2A:
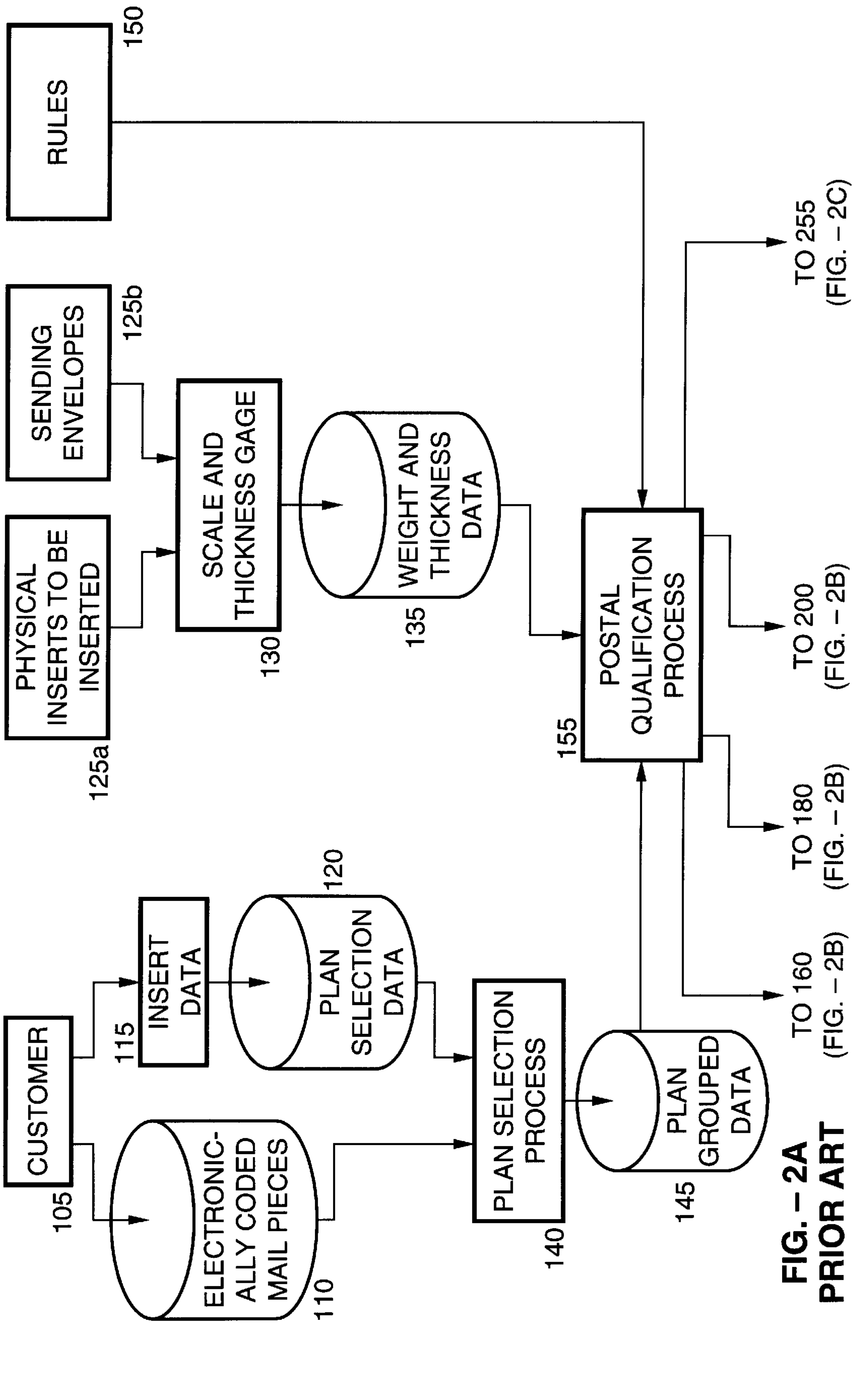
FIG. – 2A PRIOR ART
FIG. 2A is prior art showing a flow diagram indicating information concerning a customer's mailing plan, weight and thickness data, and rules entering the subject subsystem's postal qualification process.
Figure 2B:
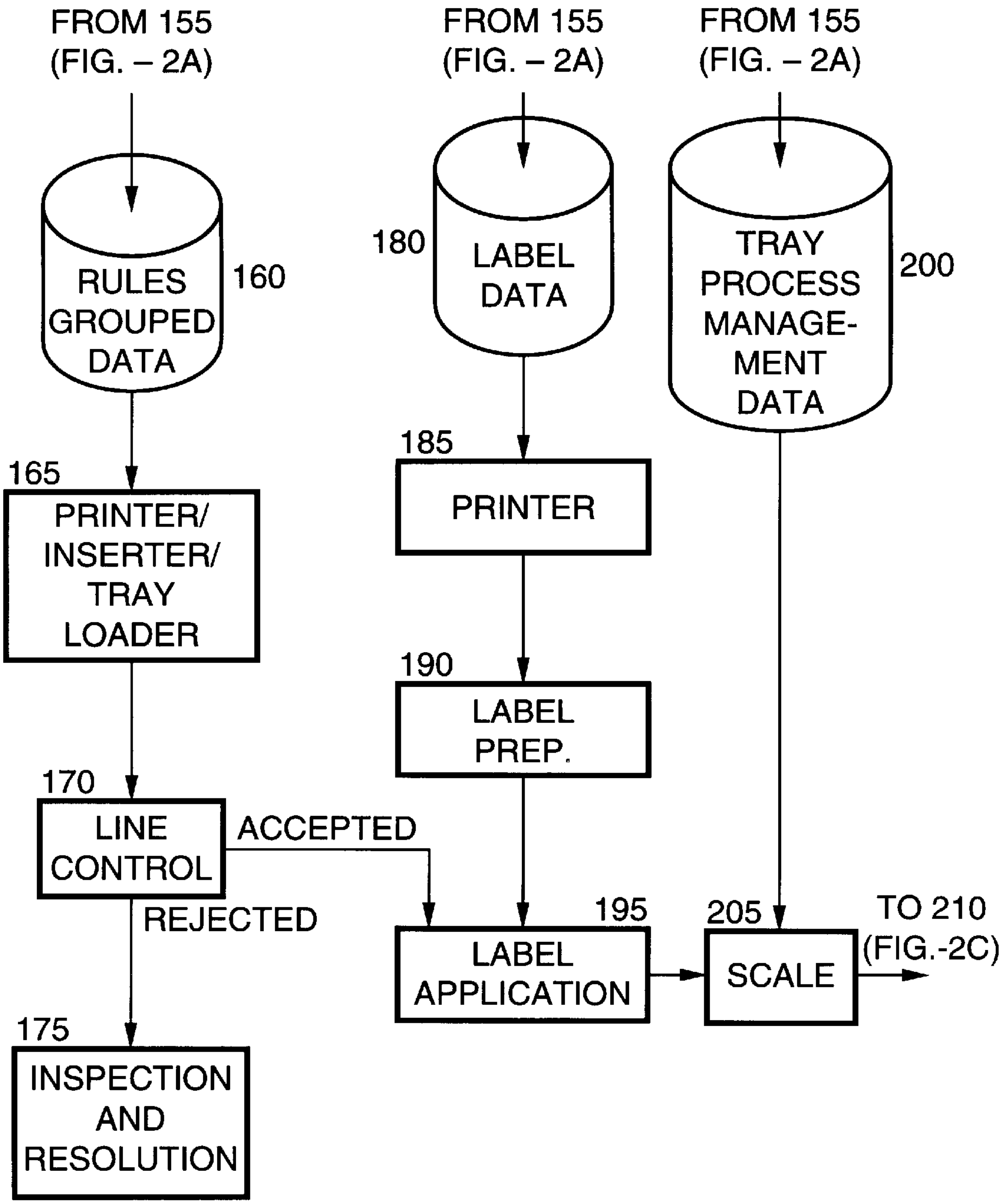
FIG. – 2B PRIOR ART
FIG. 2B is prior art showing a flow diagram indicating information leaving the subject sub-system's postal qualification process for optimizing the loading of mailing trays and printing tray labels.
Figure 2C:
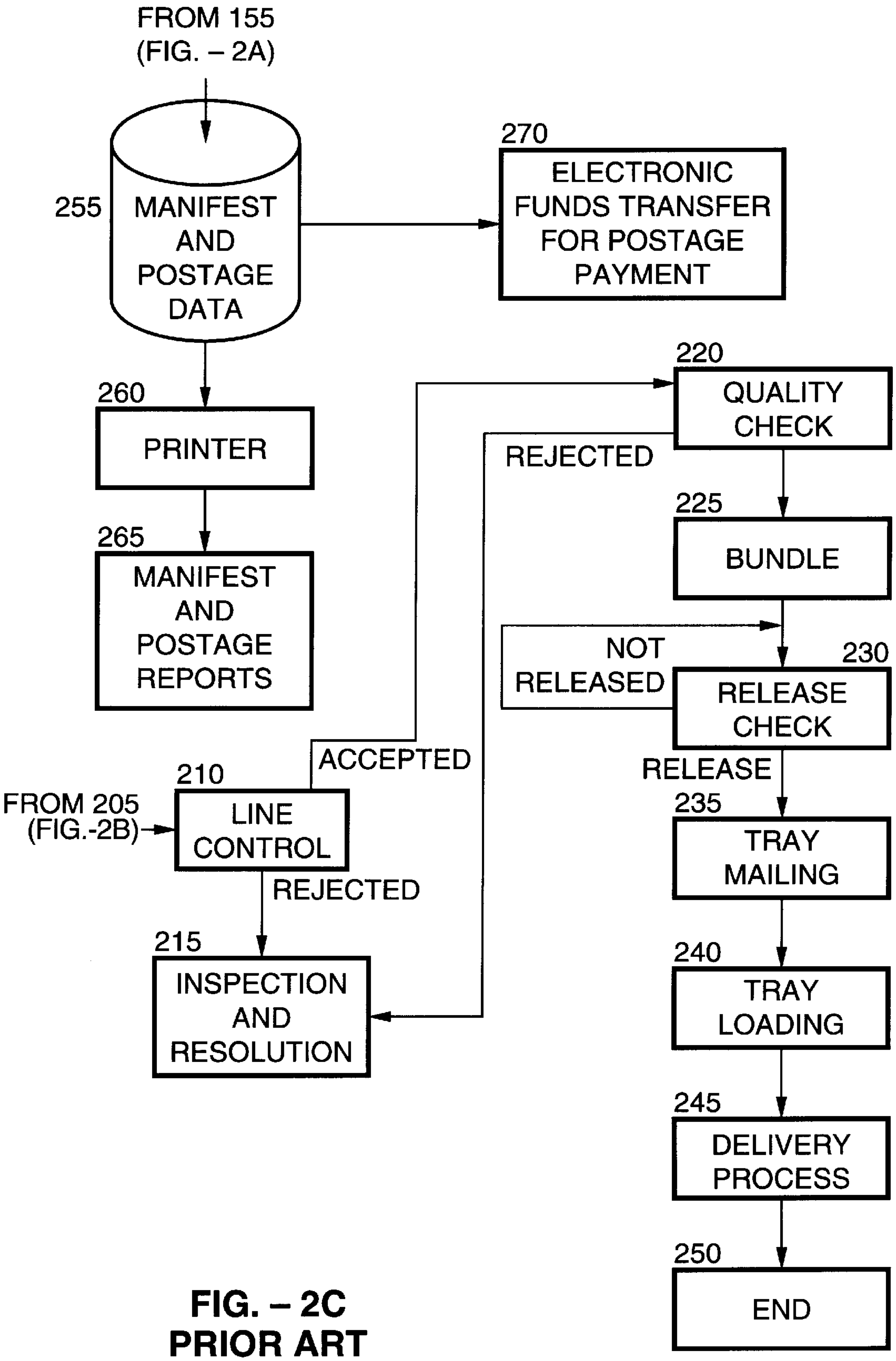
FIG. – 2C PRIOR ART
FIG. 2C is prior art a flow diagram indicating information leaving the subject sub-system's postal qualification process for finalizing and checking the optimization of loading mailing trays, for creating a postal manifest and postage reports, and for electronically transferring postage payment funds.

Referring now to FIGS. 2A, 2B, and 2C, there is shown a preferred embodiment of a computer directed sub-system for use by an operator or controlling computer, here in association with the statement pack system, in sending mailing pieces through the mail. FIGS. 2A, 2B, and 2C are all part of one large flow diagram and interconnect to one another as indicated in the figures (basically, FIG. 2A is positioned above FIGS. 2B and 2C, with FIG. 2B to the left of FIG. 2C). For purposes of explanation, the subject sub-system is discussed in terms of an operator of the mailing sub-system, a service provider or customer who hires the operator to perform a mailing job, and a user or consumer to whom a mailed item (statement pack) is sent. Other combinations and variations (specifically in use with forming cost saving statement packs) of this basic pattern of parties is considered to be within the realm of this disclosure. Generally, the figures relate to the information and processing flow that occurs at the operator's mailing facility (except the final delivery process and funds transfer, see below).

Each mailed item is termed a mailing piece and comprises a sending envelope containing various types and quantities of inserts (remembering that the term "inserts" is very broad and includes billing statements individually enveloped or grouped and the other above listed items). The sending envelope is of any standard type and may have an address window and mailing associated indicia. Additionally, each insert may need to be folded one or more times before it is inserted into a sending envelope.

The subject sub-system is directed from a data processing location by at least one programmed computer and, generally, more than one computer is involved with the required interfacing. Usually, a central computer processes the bulk of the information (utilizing periodically or constantly updated general data files, key files, and the like) and processing line control computers handle particular subdivisions of the mailing process like thickness and weight comparisons, as indicated in detail below. In any case, the central computer oversees and integrates into the statement pack system the operation of the sub-system and communicates with or directs the individual components of the subject sub-system.

Usually, the operator deals with many service providers or customers and it is the statements from these multiple service providers that are combined together into the statements packs noted above, however, for clarity of how the sub-system function in the simplest case, only one such customer 105 is indicated in FIG. 2A. Thus, the following example is illustrative of the postal processing technique for loading a cost effective mailing trays and is directly applicable to the multiple service provider statement pack case. That customer 105 has a particular collection of consumers that are to receive mailing pieces. Associated with the collection of consumers is a consumer data base 110 that contains postal coding information (e.g. electronically coded zip and zip-plus-four or six codes, delivery point barcodes, carrier routes, and the like) customer text, statement information, graphic information (for printing a logo on a billing statement and the like), and similar mailing, billing, and general informational items.

The customer 105 supplies insert data 1 15 to the operator indicating a set of exact inserting instruction or a plan for each particular mailing. Included in the inserting instructions plan are directions indicating which types of inserts are to be included in each mailing piece. The plan selection data 120 is then stored for use by the sub-system's central computer.

In order to fulfill the requirements of the postal agency's direct mail traying rules exact information is obtained concerning the sending envelope ("sending envelope" includes the more specific term "master envelope") and inserts. As seen in FIG. 2A., different types of physical inserts (including bills or billing statements that need to be printed, return envelopes, ads, and the like as indicated above) 125*a* and sending envelopes 125*b* are sent to suitable instruments for determining individual weights and thicknesses 130. Some of the inserts, such as billing statements and other items, are folded for insertion into the sending envelope and the thickness of the folded form is recorded. The individual insert weight and thickness data for each type of insert and sending envelope is stored in data files 135 for later use in the sub-system. Weight and thickness consideration of a typical mailing tray are standard values, but may be determined in a similar manner.

Usually, the plan selection data 120 is used by the central computer, along with the individual weight and thickness data 135 and other relevant processing data, to generate a pregrouping (without considering exact postal discount rules for optimum benefits) electronically formatted mailing pieces 140 (eventually these will be physical mailing pieces). The pregrouping is based on the unique combination of insert types that are inserted into each sending envelope, weight ranges, thickness ranges, physical equipment requirements, capabilities, and limitation, and like considerations that aid in maximizing the efficiency and cost benefits of the subject sub-system. The results of the pregrouping process is then stored in data form 145 for later use by the sub-system.

A postal agency's direct mail rules 150 are included in the information available to the central computer. For example, in the United States, the United States Postal Service direct mail rules and regulation are employed in the subject process.

The postal qualification process 155 for accessing and optimizing the benefits of the postal agency's rules is carried out by the overseeing central computer. The central computer programmed qualification process utilizes the postal rules and regulations 150, individual insert thickness and weight determinations 135, and pregrouping information 145 to presort electronic mail pieces (the theoretical pieces that will eventually be mailed in their physical form as actual mailing pieces) into appropriate postal discount structures. Based on the applicable postal traying rules, the computer directed process 155 then prearranges (before physically arranging the mailing pieces in the mailing trays) the mailing pieces in sequence (alphabetical, ordered zip codes, or any other desired sequence) within individual bundles (a bundle is a postal rules dictated subdivision of mailing pieces that is usually rubber-banded within a mailing tray) and mailing trays. Once again, the postal agency traying rules control mailing piece combinations that produce acceptable thicknesses for bundles and mailing tray total thickness limits. In this process 155 unique identification is assigned to each mailing piece. The unique identification may include customer information, consumer information, bundling requirements, and the like. Also, the process 155 maximizes or optimizes the postal discount by applying (through standard types of programming techniques) the postal rules and minimizes the number of bundles while meeting the postal rule requirements for bundle size and mailing tray limits. The process 155 identifies the first and last mailing piece (and thus the ones in between too) held within each bundle, mailing tray, and service provider or customer job.

Specifically, for a particular loaded tray, the first-to-last range exactly indicates which of the users or consumers are within that tray. The specific identification of each mailing piece within each mailing unit is especially helpful in locating (i.e. forming the statement packs and the like) tracking (i.e. through the mails or the like) a particular individual billing envelope, general item, or mailing piece. It should be appreciated that only a few of the various possible postal rules have been noted here and that other rule consideration are easily incorporated into the programming of the sub-system.

A postal rules qualified data base 160 is created and holds the electronically grouped mailing pieces by exact mailing piece sequence within each mailing tray and postal rate qualifications within each selected service provider or customer plan. The files within this data base 160 also contain printing, inserting, tray loading, and overlay (printing a logo, trademark or other information on a form or similar operation) controls.

The physical process of creating the mailing pieces 165 is overseen and controlled by the central computer using the postal rules qualified data base 160 and includes the initial printing, inserting, and tray loading events. Each billing statement and other document that requires printing is printed at this stage by an appropriately controlled printing means. Plan selected inserts are inserted by insertion means into a sending envelope. As indicated above, the mailing pieces are loaded into a mailing tray based on known first and last mailing pieces.

Preferably, after the mailing tray loading operation a line control check 170 is performed to establish if the actual number of mailing pieces placed in the tray by the loader corresponds to the projected number of mailing pieces calculated by the central computer in the optimization process 155. Usually, the line control check 170 is carried out by a local computer in communication with the central computer. Should a difference be found between the actual and projected number of mailing pieces within a mailing tray the tray is rejected 175. Generally, rejected mailing trays are processed further by manual inspection and resolution. Accepted mailing trays proceed to the next station in the process.

Based on the information developed in the postal qualification process 155 a mailing tray data base 180 is created. This data base 180 contains the information needed to print both a mailing tray label and an ACT tag. Each mailing tray label contains information identifying the contents of the tray, such as customer, first and last mailing piece, necessary bundling restrictions, included zip codes, and like facts. The ACT tag indicates the mailing destination airport, such as LAX for Los Angeles and similar location information.

The mailing tray label and ACT tag data 180 is employed to print 185 the corresponding items. Usually, the printed label contains information in both machine readable form (such as a bar code) and, at least in part, in directly human readable form. Although the mailing tray label and ACT tag are usually printed as a single unit, separate items may be generated. The printed mailing tray labels and ACT tags are conveyed 190 to the mailing tray processing line for application 195 to accepted mailing trays by suitable means.

From the postal qualification process 155, a mailing tray management data base 200 is created. Included in this data base 200 are the projected mailing tray weights, thickness, and mailing pieces included.

After a mailing tray is labeled 195, each mailing tray is physically weighed 205 by appropriate means. Immediately following the actual weighing, a line control check is performed 210 to determine if the actual weight compares favorably with the projected weight (from data base 200) for the tray. This comparison means 210 establishes an acceptable weight variance between the actual and projected tray weights. The amount or size of an acceptable weight variance is within the realm of the exact postal rules and quality control limitations. Naturally, the weight of the mailing tray is considered in the weighing and is subtracted in the process. Usually, the line control check 210 is carried out by a local computer in communication with the central computer. Should a difference be found between the actual and projected weights of the loaded mailing trays, the mailing tray is rejected and is processed 215 for resolution. Accepted mailing trays proceed on in the mailing process.

Although mechanical means may be employed in the remaining steps of the a typical mailing, usually, a technician's physical handling of the mailing trays starts. Next, the acceptable weight mailing tray is passed to a question and answer process for quality control 220 that is based on the postal agency's rules and regulations for a mailing tray.

Following the quality control 210, 215, and 220 inspection is a bundling process 225 that associates the required mailing pieces into the necessary bundles, as required by the postal rules and indicated on each mailing piece.

A final quality control check 230 is performed in which all of the required postal rules are verified as being applied to each mailing tray. If a tray fails it is reworked to correct the errors. Accepted and released mailing trays proceed to a tray mailing station 235 in which the tray bar codes are read and communicated to the central computer for establishing the actual postage due to the postal agency.

The mailing trays are then loaded 240 onto an appropriate transportation holder such as an airstop cage for conveyance into the postal agency's delivery sub-system 245. The mailing events end at this point 250.

For purposes of tracking exactly what is mailed and for meeting the requirements of the postal agency, the postal qualifying process 155 creates a postal agency manifest and postage data base 255. From this data base 255 is drawn the information necessary for printing 260 postal agency manifests and postage reports 265.

Further, the manifest and postage data base 255 can be employed in an automated electronic conveyance 270 of the included information to the necessary organizations to accomplish electronic funds transfers and postage payments.

Figure 3:
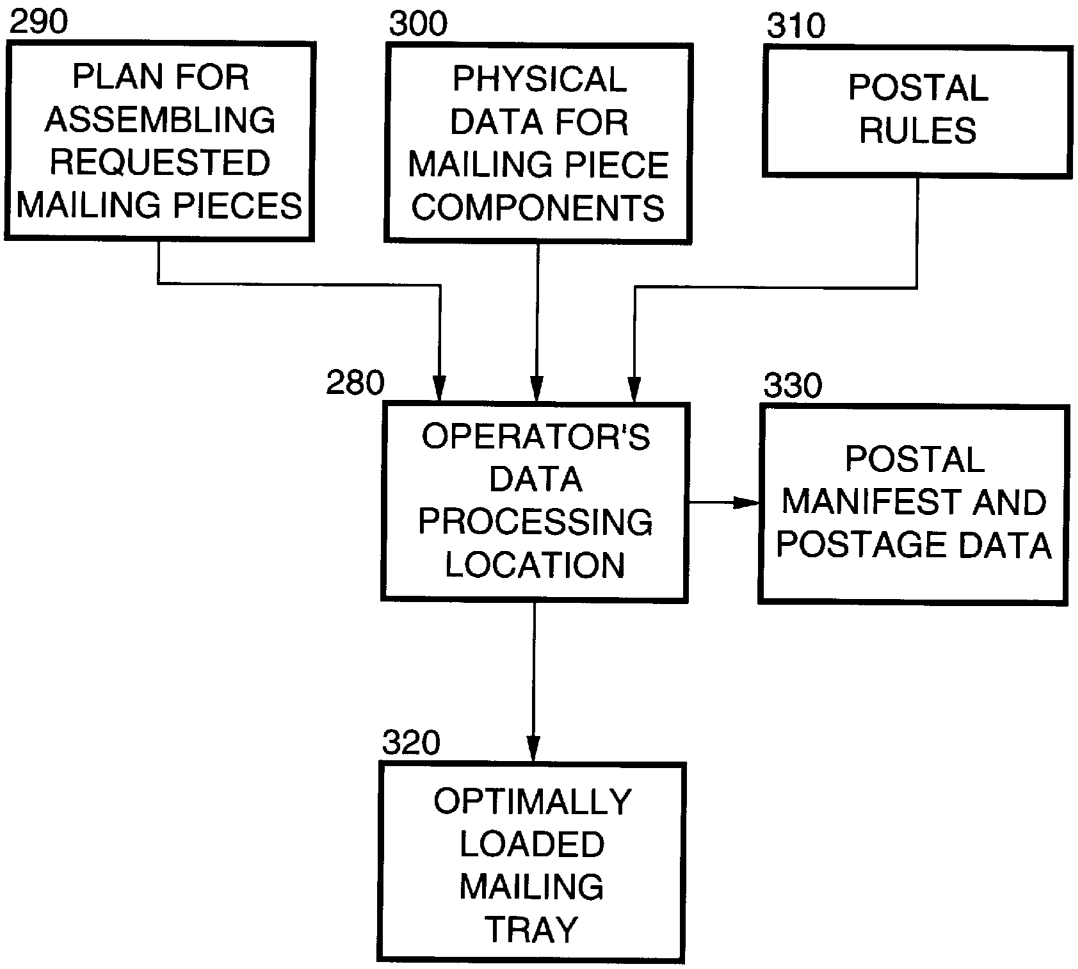
FIG. – 3 PRIOR ART
FIG. 3 is prior art showing a summary flow diagram of the central components of the subject postal processing subsystem.
Figure 1:
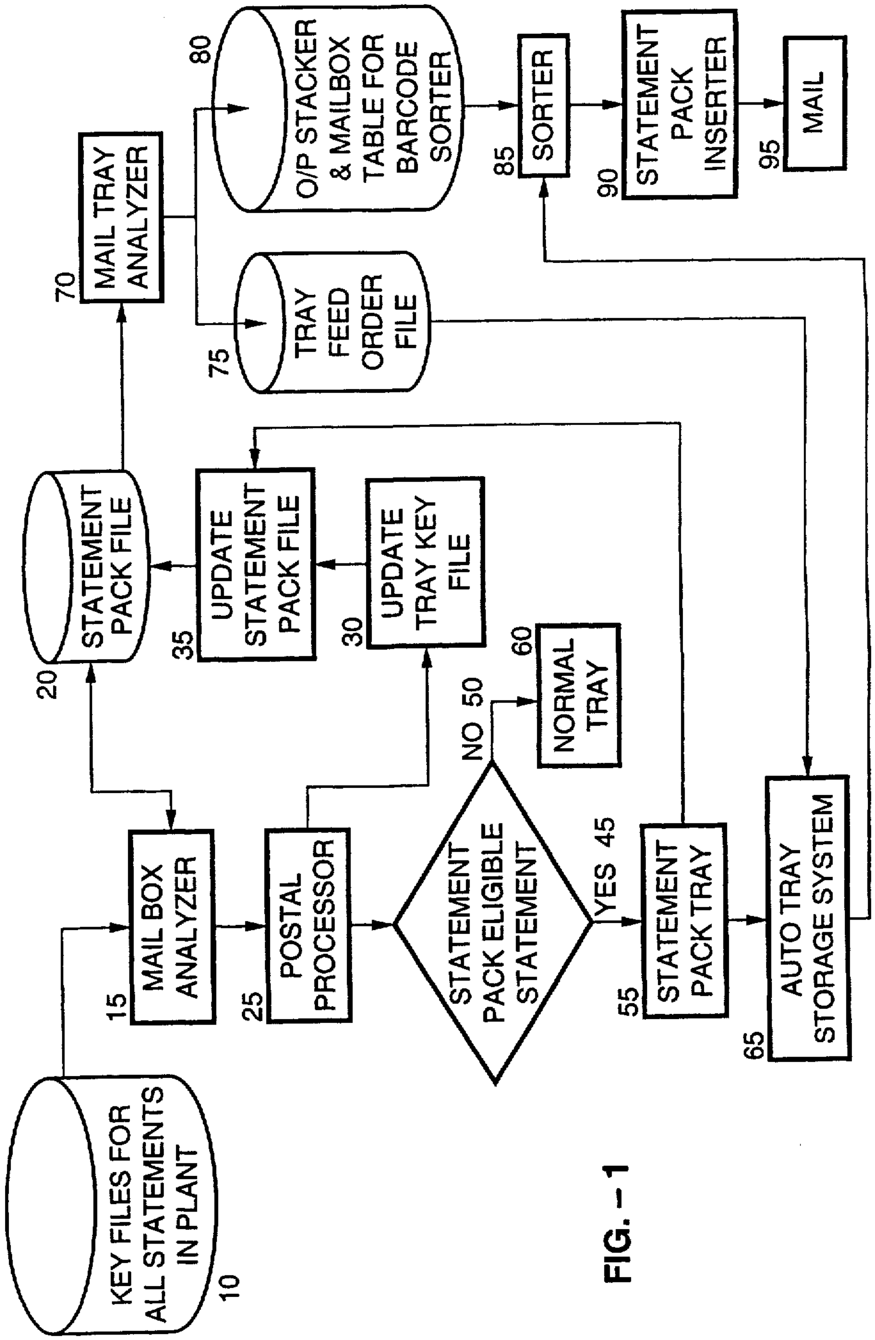

By way of summary for the central components of the subject sub-system, as illustrated in FIG. 3, the operator of the sub-system has a data processing location 280 that comprises the computer means noted above. At the request of customers, plans are created 290 for assembling the various inserts and envelopes into the desired consumer directed mailing pieces. The physical data concerning the inserts and envelope individual thickness and weight determinations 300 are collected and communicated to the central data processing location. Further, the applicable postal rules are transferred from the data base containing the rules 310 to the operator's data processing location. The input information is then employed to load optimally each mailing tray 320 for mailing. Additionally, postal manifest and postage data 330 is provided from the data processing location.

The invention has now been explained with reference to specific embodiments. Other embodiments will be suggested to those of ordinary skill in the appropriate art upon review of the present specification. Although the foregoing invention has been described in some detail by way of illustration and example for purposes of clarity of understanding, it will be obvious that certain changes and modifications may be practiced within the scope of the appended claims.

What is claimed is:

1. A billing system for combining, into a minimum number of master mailing envelopes, individual user billing statements, comprised of one or more constituent documents, from the same or different service providers that are to be delivered to a common mailbox, comprising:

a) means utilizing postal coding information for determining which user billing statements are delivered to the common mailbox and b) means for combining into a minimum number of master mailing envelopes a cost effective number of user billing statements being delivered to a common mailbox.

2. A billing system for combining, into a minimum number of master mailing envelopes, individual user billing statements, comprised of one or more constituent documents, from the same or different service providers that are to be delivered to a common mailbox, comprising:

a) key files containing data relevant billing information for each user billing statement from each service provider participating in the combination billing system;

b) means incorporating postal coding, indicative of the common mailbox, for analyzing said key files to determine which user billing statements are to be delivered to a common mailbox;

c) means for analyzing, in association with said postal code incorporating means for delivery to a common mailbox, and generating a statement pack file indicating the most cost effective combination of user billing statements eligible to be placed in a minimum number of master billing envelopes based on a weight and a thickness determination for each document comprising each user billing statement; and d) means for determining optimal loading of a mailing tray with the combined billing statements utilizing and updating said generated statement pack file.

3. A billing system according to claim 2, further comprising means for determining said weight and thickness values.

4. A billing system according to claim 2, further comprising means for assembling each of the user billing statements into an individual envelope from the constituent documents required to form each user billing statement that is eligible for combining into a minimum number of master mailing envelopes and loading each said individual envelope containing a user billing statement into a statement pack tray.

5. A billing system according to claim 5, further comprising means for obtaining from each said statement pack tray the user billing statements that are to be delivered to a common mailbox and therefore combined into the minimum number of master mailing envelopes and inserting said user billing statements into the minimum number of master mailing envelopes.

6. A billing system according to claim 5, further comprising means for printing mailing information on each said master mailing envelope.

7. A billing system according to claim 5, further comprising means for printing a list of each user billing statement contained in each said master mailing envelope on each said master mailing envelope.

8. A billing system for combining into a statement pack having a single master mailing envelope, individual user billing statements from the same or different service providers that are to be delivered to a common mailbox, comprising:

a) key files containing data relevant billing information for each user billing statement from each service provider participating in the combination billing system;

b) means for incorporating postal zip-plus-six number in a process for analyzing said key files to determine which user billing statements are to be delivered to a common mailbox;

c) means directed by a computer for analyzing and generating, in association with said key files and postal code incorporating means, a statement pack file indicating the most cost effective combination of user billing statements to be placed in the master billing envelope based on a weight and a thickness value for each document comprising each user billing statement;

d) means for determining optimal loading of a mailing tray with either non-combined billing statements or the combined billing statements utilizing and updating said generated statement pack file;

e) means for assembling and loading optimally each said non-combined billing statement into a normal mailing tray;

f) means for assembling each of the user billing statements into an individual envelope from the constituent documents required to form each user billing statement that is eligible for combining into a minimum number of master mailing envelopes and loading each said individual envelope containing a user billing statement into a statement pack tray; and g) means for obtaining from each said statement pack tray the user billing statements that are to be delivered to a common mailbox and therefore combined into the single master mailing envelope and inserting said user billing statements into the master mailing envelopes.

9. A billing system according to claim 8, further comprising means for determining said weight and thickness values.

10. A billing system according to claim 8, further comprising means for printing mailing information on each said master mailing envelope.

11. A billing system according to claim 10, further comprising means for printing a list of each user billing statement contained in each said master mailing envelope on each said master mailing envelope.

12. A billing system according to claim 8, wherein said means for obtaining from each said statement pack tray the user billing statements that are to be delivered to a common mailbox and inserting said user billing statements into a single master mailing envelope to create a statement pack comprises:

a) a statement pack tray storage system having means for identifying the location of each statement pack tray which in turn identifies which individual envelopes are within each statement pack tray;

b) means for identifying which statements pack trays are to be pulled for assembly of the statement packs; and c) a sorter for grouping individual envelopes that will be combined into a statement pack into sorted trays; and d) a statement pack inserter for assembly of the statement pack from grouped individual envelopes.

13. A billing system according to claim 12, wherein said statement pack inserter comprises:

a) means for printing postal address information on the master envelope;

b) means for printing on the master envelope which said individual envelopes having billing statements are contained within the master envelope; and c) means for inserting individual envelopes and any other selected inserts into said master envelope.

14. A computer directed method for combining consumer billing statements from the same or different service providers that are to be delivered to a common mailbox in a statement pack, wherein items within each statement pack include at least one master envelope, one or more billing statements with each billing statement comprising one or more billing sheets held within an individual statement envelope, and optionally, various types and quantities of inserts either within each individual statement envelope or not within each individual statement envelope but within the master envelope, wherein said method comprises the steps:

a) identifying with the aid of the computer billing statements that are to be delivered to the common mailbox;

b) determining weights and thicknesses for each of the items comprising the statement pack; and c) establishing with the aid of the computer the most cost effective combination of one or more billing statements and other items comprising the statement pack to maximize savings in postal costs for delivering the statement pack by utilizing postal agency mailing discount rates that require adherence to a set of postal agency qualification rules.

15. A method for combining consumer billing statements according to claim 14, further comprising the step of loading mailing trays with statement packs in a manner that maximizes savings in postal costs for assembling mailing trays in a manner that benefits from discount postal rates that require adherence to a set of postal agency qualification rules for filling said mailing trays.

16. A computer directed method for combining consumer billing statements from the same or different service providers that are to be delivered to a common mailbox in a statement pack, wherein items within each statement pack include a master envelope, one or more billing statements with each billing statement comprising one or more billing sheets from a particular service provider held within an individual statement envelope, and optionally, various types and quantities of inserts either within each individual statement envelope or not within each individual statement envelope but within the master envelope, wherein said method comprises the steps:

a) identifying with the aid of the computer all billing statements having a common mailbox delivery point based on a postal zip-plus-six mailbox number;

b) determining weights and thicknesses for each of the items comprising the statement pack; and c) establishing with the aid of the computer the best combination of one or more billing statements and other items comprising the statement pack to maximize savings in postal costs for delivering the statement pack by utilizing postal agency mailing discount rates that require adherence to a set of postal agency qualification rules.

17. A method for combining consumer billing statements according to claim 16, further comprising the step of loading mailing trays with statement packs in a manner that maximizes savings in postal costs for assembling mailing trays in a manner that benefits from discount postal rates that require adherence to a set of postal agency qualification rules for filling said mailing trays.

18. A computer directed method for combining into a statement pack individual user billing statements from the same or different service providers that are to be delivered to the same mailbox, thereby minimizing a number of mailing envelopes required, wherein said methods comprises the steps:

a) identifying with the aid of the computer all billing statements having a common mailbox delivery point based on a delivery point barcode;

b) determining weights and thicknesses for each item within the statement pack; and c) establishing with the aid of the computer the most cost effective combination of one or more billing statements and other items comprising the statement pack to maximize savings in postal costs for delivering the statement pack by utilizing postal agency mailing discount rates that require adherence to a set of postal agency qualification rules.

19. A method for combining consumer billing statements according to claim 18, further comprising the step of loading mailing trays with statement packs in a manner that maximizes savings in postal costs for assembling mailing trays in a manner that benefits from discount postal rates that require adherence to a set of postal agency qualification rules for filling said mailing trays.

20. A computer directed method for combining user billing statements from the same or different service providers that are to be delivered to a common mailbox in a statement pack, wherein items within each statement pack include a master envelope, one or more billing statements with each billing statement comprising one or more billing sheets from a particular service provider, and optionally, various types and quantities of inserts within the master envelope, wherein said method comprises the steps:

a) creating key files for each of the user billing statements that have relevant billing and postal coding information;

b) analyzing which user billing statements will be delivered to a common mailbox based on said postal coding information and a weight and thickness for each item within the statement pack, whereby a most cost effective combination of items within the master mailing envelope is achieved;

c) producing a statement pack file having all billing statements that can be combined into a statement pack;

d) processing said statement pack file through means for producing the billing statements and optimally loading statement pack mailing trays containing the combinable billing statements and updating said statement pack file with optimal loading information, whereby said producing and loading means labels each statement pack tray with an identifying label;

e) storing optimally loaded statement pack mailing trays that are accessed by means of said identifying label;

f) generating a statement pack tray feed order file indicating the order in each which statement pack tray is to be pulled for delivery to a sorter having stackers for holding billing statements;

g) constructing a stacker file indicating which billing statements are placed in which output stacker of said sorter that feeds an inserter that forms the statement pack;

h) utilizing said order file and said stacker file in conjunction with an inserter to produce each of the combined statement packs; and i) loading mailing trays with statement packs for mailing.

21. A method according to claim 20, further comprising the step of printing postal information on each master mailing envelope.

22. A method according to claim 20, further comprising the step of printing on each master mailing envelope a list of billing statements enclosed in each master mailing envelope.

23. A computer directed method for combining user billing statements from the same or different service providers that are to be mailed to a common mailbox in a statement pack, wherein items within each statement pack include a master mailing envelope, one or more billing statements with each billing statement comprising one or more billing sheets from a particular service provider held within an individual statement envelope, and optionally, various types and quantities of inserts either within each individual statement envelope or not within each individual statement envelope but within the master envelope, wherein said method comprises the steps:

a) creating key files for each of the user billing statements that have relevant billing and postal coding information;

b) analyzing which user billing statements will be delivered to a common mailbox based on said postal coding information and a weight and thickness for each item within the statement pack, whereby a most cost effective combination of items within the master mailing envelope is achieved;

c) producing a statement pack file having all billing statements that can be combined into a statement pack;

d) processing said statement pack file through means for producing the billing statements and optimally loading statement pack mailing trays containing the combinable billing statements and updating said statement pack file with optimal loading information, whereby said producing and loading means labels each statement pack tray with an identifying label;

e) storing optimally loaded statement pack mailing trays that are accessed by means of said identifying label;

f) generating a statement pack tray feed order file indicating the order in which each statement pack tray is to be pulled for delivery to a sorter having stackers;

g) constructing a stacker file indicating which billing statements are placed in which output stacker of said sorter that feeds an inserter that forms the statement pack;

h) utilizing said order file and said stacker file in conjunction with an inserter to produce each of the combined statement packs; and i) loading mailing trays with statement packs for mailing.

24. A method according to claim 23, further comprising the step of printing postal information on each master mailing envelope.

25. A method according to claim 23, further comprising the step of printing on each master mailing envelope a list of billing statements enclosed in each master mailing envelope.

26. A method according to claim 23, further comprising the step of inserting into each master mailing envelope additional inserts.

27. A method for combining, to produce a statement pack, user billing statements from the same or different service providers that are to be delivered to a common mailbox in a master mailing envelope, wherein items within each master mailing envelope include one or more billing statements with each billing statement from the same or different service provider, and optionally, various types and quantities of inserts, wherein the method comprises the steps:

a) identifying billing statements that are to be delivered to the common mailbox;

b) determining weights and thicknesses for each piece within the statement pack; and c) establishing the most cost effective combination of one or more billing statements and other items comprising the statement pack to maximize savings in postal costs for delivering the statement pack by utilizing postal agency mailing discount rates that require adherence to a set of postal agency qualification rules.

28. A method for combining consumer billing statements into a statement pack according to claim 27, further comprising the step of loading mailing trays in a manner that maximizes savings in postal costs for assembling mailing trays that benefit from discount postal rates that require adherence to a set of postal agency qualification rules for filling the mailing trays.

29. A method for combining into a statement pack individual user billing statements from the same or different service providers that are to be delivered to the same mailbox, thereby minimizing a number of mailing envelopes required, wherein the methods comprises the steps:

a) identifying all statements having a common mailbox delivery point based on a postal zip-plus-six mailbox number;

b) determining weights and thicknesses for each piece within the statement pack; and c) establishing the most cost effective combination of one or more billing statements and other items comprising the statement pack to maximize savings in postal costs for delivering the mailing piece by utilizing postal agency mailing discount rates that require adherence to a set of postal agency qualification rules.

30. A method for combining consumer billing statements according to claim 29, further comprising the step of loading mailing trays in a manner that maximizes savings in postal costs for assembling mailing trays that benefit from discount postal rates that require adherence to a set of postal agency qualification rules for filling the mailing trays.

31. A method for combining into a statement pack individual user billing statements from the same or different service providers that are to be delivered to the same mailbox, thereby minimizing a number of mailing envelopes required, wherein the methods comprises the steps:

a) identifying all statements having a common mailbox delivery point based on a postal delivery point barcode;

b) determining weights and thicknesses for each piece within the statement pack; and c) establishing the most cost effective combination of one or more billing statements and other items comprising the statement pack to maximize savings in postal costs for delivering the mailing piece by utilizing postal agency mailing discount rates that require adherence to a set of postal agency qualification rules.

32. A method for combining consumer billing statements according to claim 31, further comprising the step of loading mailing trays in a manner that maximizes savings in postal costs for assembling mailing trays that benefit from discount postal rates that require adherence to a set of postal agency qualification rules for filling the mailing trays.

* * * * *

UNITED STATES PATENT AND TRADEMARK OFFICE
CERTIFICATE OF CORRECTION

PATENT NO. : 5,774,885

DATED : June 30, 1998

INVENTOR(S) : Frank W. Delfer, III

It is certified that error appears in the above-identified patent and that said Letters Patent is hereby corrected as shown below:

In the drawings: Fig 1, should be deleted and substituted with the attached Fig 1.

Signed and Sealed this

Sixth Day of October, 1998

*Attest:*

BRUCE LEHMAN

*Attesting Officer*

*Commissioner of Patents and Trademarks*